United States Patent [19]

Ban et al.

[11] Patent Number: 4,827,880
[45] Date of Patent: May 9, 1989

[54] PULSATION CONTROLLER IN THE INTAKE/EXHAUST SYSTEMS OF INTERNAL COMBUSTION ENGINES

[75] Inventors: Masaki Ban, Tokyo; Kazuman Taniuchi; Hiroyuki Morita, both of Saitama, all of Japan

[73] Assignee: Honda Giken Kogyo Kabushiki Kaisha, Tokyo, Japan

[21] Appl. No.: 97,515

[22] PCT Filed: Dec. 27, 1986

[86] PCT No.: PCT/JP86/00671
§ 371 Date: Sep. 21, 1987
§ 102(e) Date: Sep. 21, 1987

[87] PCT Pub. No.: WO87/04218
PCT Pub. Date: Jul. 16, 1987

[30] Foreign Application Priority Data

Dec. 28, 1985 [JP] Japan .............................. 60-299291

[51] Int. Cl.⁴ ...................... F02B 27/00; F02B 27/02; F02B 27/06
[52] U.S. Cl. ................................ 123/65 E; 123/65 P; 60/314
[58] Field of Search ................ 123/65 PE, 65 V, 323, 123/65 P, 316, 52 MB, 315, 65 E; 60/314, 312

[56] References Cited

U.S. PATENT DOCUMENTS

| 3,367,311 | 2/1968 | Tenney | 60/314 |
| 3,703,937 | 11/1972 | Tenney | 60/314 |
| 4,430,975 | 2/1984 | Ishida et al. | 123/478 |
| 4,549,518 | 10/1985 | Koumura | 123/494 |
| 4,557,233 | 12/1985 | Joppig et al. | 188/273 |
| 4,664,076 | 5/1987 | Miyano et al. | 123/52 MB |

FOREIGN PATENT DOCUMENTS

| 0112823 | 9/1980 | Japan | 60/314 |
| 60-184924 | 9/1985 | Japan . | |
| 61-76718 | 4/1986 | Japan . | |
| 61-291721 | 12/1986 | Japan . | |

*Primary Examiner*—David A. Okonsky
*Attorney, Agent, or Firm*—Lyon & Lyon

[57] ABSTRACT

The invention relates to a pulsation controller in the intake/exhaust systems of internal combustion engines inclusive of two-cycle gasoline engines, four-cycle engines and rotary piston engines, and includes a device for detecting by means of a sensor pulsation in the intake/exhaust pipes connected to a cylinder, and a control means for allowing the desired pressure wave in the pulsation to coincide with the given position of the intake/exhaust system by the detection result obtained by this sensor. The phase of a standing wave in the intake/exhaust system of the engine is detected to control the impedance or the timing for opening and closing valves or ports in the intake/exhaust system and, hence, the phase of a standing wave in the intake/exhaust system, thereby improving the intake/exhaust efficiency for more efficient operation.

13 Claims, 7 Drawing Sheets

Case 1: Impedance matching
Case 2: Impedance increasing operation → Opening of Balve Rod 67
Case 3: Impedance decreasing operation → Closing of Balve Rod Constant 1: Initial value Constant 2: Number of steps of pulse motor per movement

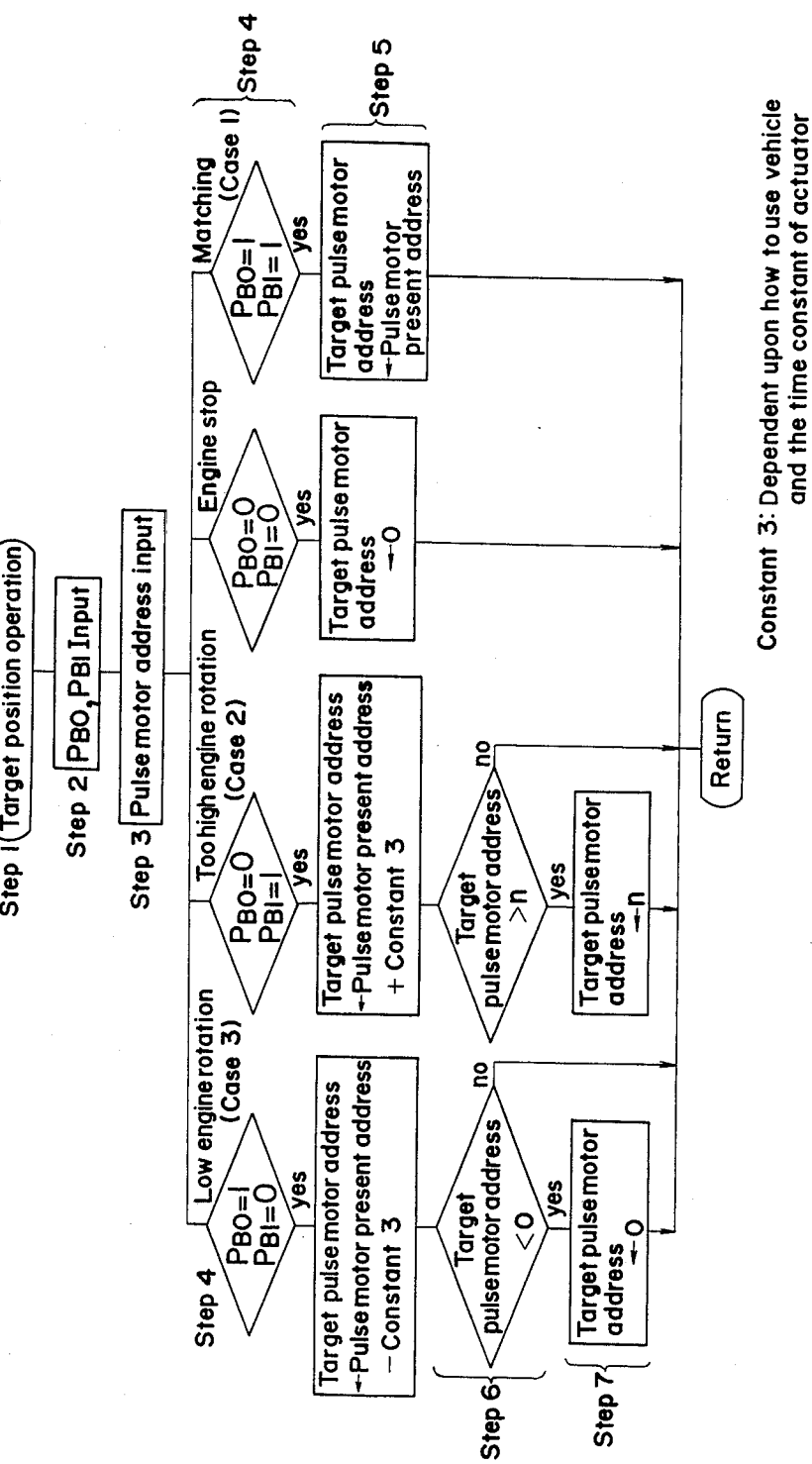

PULSATION CONTROLLER IN THE INTAKE/EXHAUST SYSTEMS OF INTERNAL COMBUSTION ENGINES

TECHNICAL FIELD

The present invention relates to an apparatus for improving the charging and intake/exhaust efficiencies in the cylinders of internal combustion engines such as two-cycle gasoline engines, four-cycle gasoline engines and rotary engines. More particularly, the present invention is concerned with a pulsation controller in the intake/exhaust system of an internal combustion engine, which is designed to detect the phase of a standing wave present in the intake/exhaust system, thereby controlling the impedence or the timing for opening or closing valves or ports in the intake/exhaust system and hence the phase of a standing wave present in that system to improve the intake/exhaust efficiencies for more efficient operation.

BACKGROUND TECHNIQUE

For instance, the piston valve type of two-cycle gasoline engine has its intake/exhaust cycle of an air/fuel mixture controlled by a port in a cylinder and a piston reciprocating within the cylinder. In order to enhance the charging efficiency of the air/fuel mixture in the cylinder, it is thus required that the air/fuel mixture be forced at a high density on the intake side, while a forcing-back action be caused to occur on the exhaust side so as to prevent blowing-through of fresh air from the cylinder. For that reason, as in the two-cycle gasoline engine shown in Laid-open Utility Model No. 55-132321, the two-cycle gasoline engine has been such that an exhaust pipe is formed into a chamber shape narrowed down at the extreme end, and exhaust gases are admitted into that portion at a timing just before an exhaust port is closed, making use of the reflected wave of exhaustion. However, it is impossible to obtain all the tuning (resonance) due to a difference in the revolutions of the engine. For that reason, various means for regulating the phase of the reflected wave in the intake/exhaust system have been taken to obtain the tuning (resonance) of the intake/exhaust pulsation.

That is to say, the exhaust timing, for instance, has generally been varied depending upon the revolutions of an engine, and there has been a system wherein arranged in the vicinity of an exhaust port is a variable regulation valve which is designed to be turned, for instance, when the revolutions of the engine is increased, thereby putting forward the exhaust timing for more satisfactory operation.

In such a conventional system, however, the revolutions of an engine is used as a control factor. Thus, this system is not complete, although it makes it possible to approximately reproduce the timing good for the intake/exhaust efficiencies obtained in advance by calculation or experimentation. In other words, the impedance in the exhaust system, the speed of sound having an influence upon the velocity of a standing wave and all other factors vary actually depending upon the degree of opening of a throttle, temperature of the intake/exhaust system, differences in atmospheric pressure due to elevation differences, changes in the volume of an exhaust chamber or deformation of chamber due to build-ups (carbon), etc. in an exhaust pipe, wearing of an engine and the like. Thus, the fact is that to use only the revolutions of an engine as the control factor cannot accommodate such changes.

The situation being like this, the present invention now develops a novel engine controller which can produce the desired output in every state of operation by directly detecting and controlling pulsation having an immediate influence upon the desired operation of such an intake/exhaust system.

DISCLOSURE OF THE INVENTION

In order to attain the aforesaid object, the present invention provides a pulsation controller in the intake/exhaust system in an internal combustion engine comprising a cylinder to which an intake pipe and an exhaust pipe are connected and a piston movably mounted within said cylinder, and carrying out the respective strokes of suction, compression, combustion and exhaustion to produce a rotation energy output, which includes: a detection means for detecting a pulsation by sensor in said intake/exhaust pipes, and a control means for allowing to coincide the desired pressure waves in said pulsation with a given position in intake/exhaust system using the results of detection by the sensor.

BRIEF DESCRIPTION OF THE DRAWINGS

FIG. 9 is a flow chart illustrating various controls corresponding to the rotation of an engine.

BEST MODE FOR CARRYING OUT THE INVENTION

Figure 1:
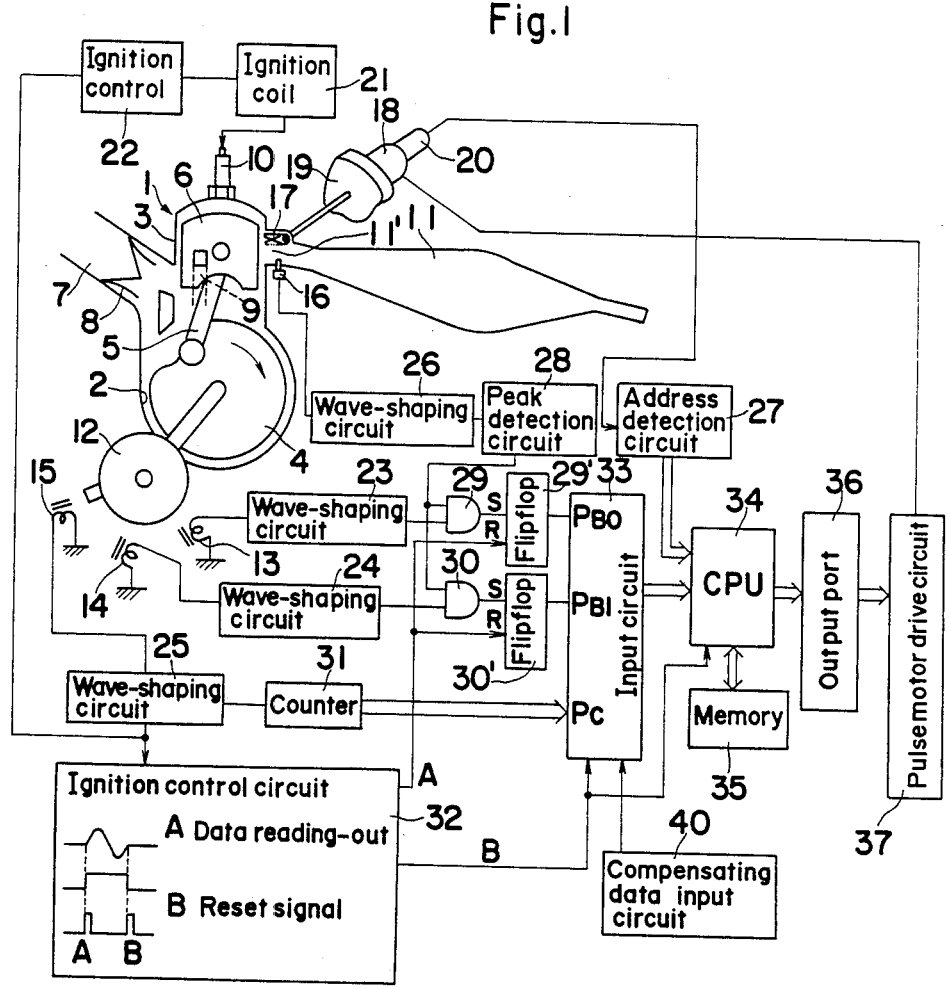
FIG. 1 is a view illustrating one embodiment of the exhaust system of a two-cycle engine, to which the present invention is applied.

In what follows, the present invention will concretely be explained specifically based on the embodiments illustrated in the drawings. The present invention is applicable to the intake/exhaust systems of internal combustion engines such as two-cycle gasoline engines, four-cycle gasoline engines and rotary piston engines with the operation being controllable by not only electronical means including microcomputers but also mechanical means.

(i) Embodiment Applied to the Exhaust System of a Two-Cycle Engine

Figure 2:
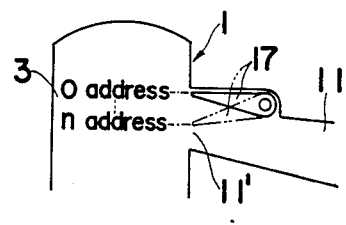
FIG. 2 is a partial enlarged sectional view of the portion of the flap valve in the aforesaid controller.
Figure 3:
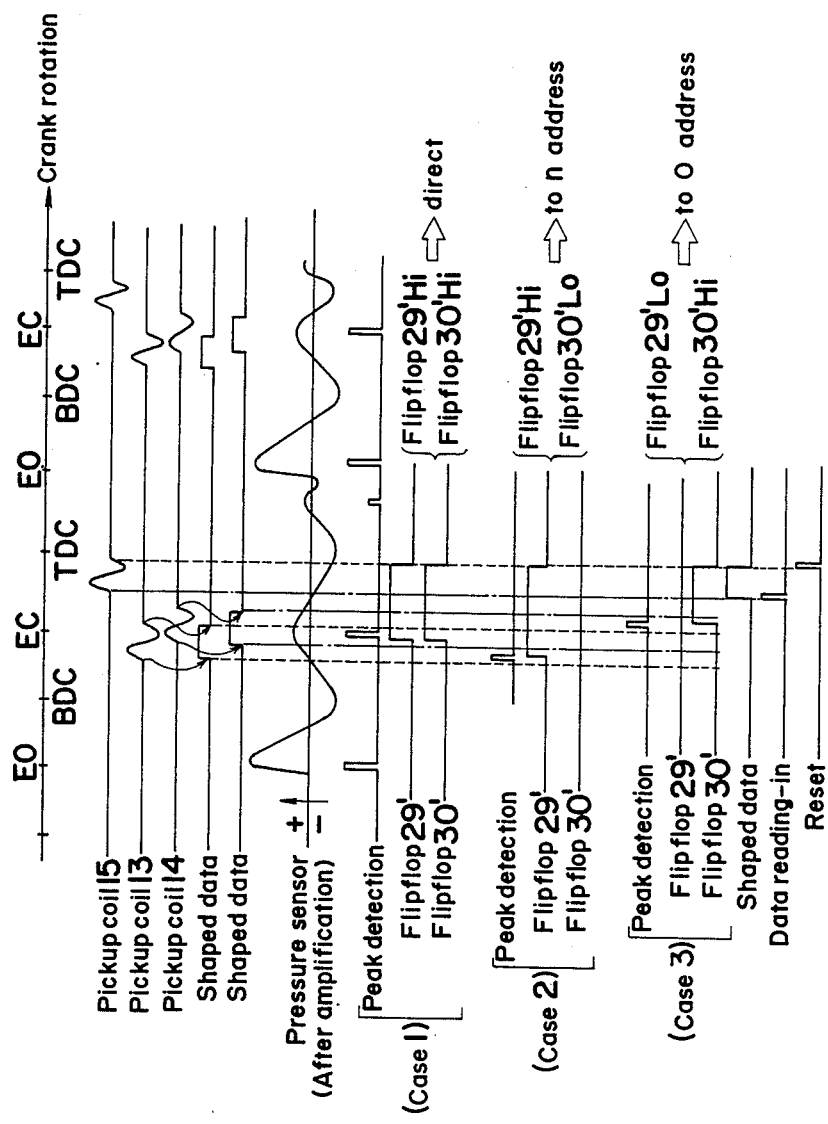
FIG. 3 is a control diagram of the aforesaid controller.

This embodiment is illustrated in FIGS. 1 to 3, wherein reference numeral 1 stands for an engine to which the present invention is applied, and which is of the two-cycle type that is the so-called piston valve type. It is understood that the application of the present invention is not limited to the piston valve type engine, and is applicable to the rotary valve type engine, as long as it is of the two-cycle type. Referring to various parts of the engine 1, reference numeral 2 is a crank case; 3, a cylinder connected onto the crank case 2; 4, a crank rotating within the crank case 2; 5, a cone rod connected to the crank 4; 6, a piston joined to the end of the cone rod 6 and reciprocating within the cylinder 3; 7, an intake pipe; 8, a lead valve located in the intake pipe 7; 9, a scavenging port for connecting the crank chamber 2 with the upper portion of the cylinder; 10, an ignition plug attached to a cylinder head mounted above the cylinder 3; and 11, is an exhaust pipe mounted on the cylinder 3, which is the so-called chamber narrowed down at the extreme end. It is to be noted that reference numeral 11' is an exhaust port which is open at the junction of the exhaust pipe 11 and the cylinder 3.

Added to such an engine is the equipment for installing the controller of the present invention, as mentioned below. First, reference numeral 12 is a rotor directly joined to the crank 4 by way of example. This rotor 12 is provided to send pulse signals to pre-pickup coil 13 and post-pickup coils 14 for setting the timing for rotation of the crank 4 as well as to a pickup coil 15 for setting ignition timing. It goes without saying that the rotor 12 per se may act such as a rotor for a generator, or may independently act simply as a plate-like rotor. A pressure sensor 16 is then mounted at one end of the exhaust pipe 11. On an upper portion of the exhaust port 11' in the vicinity of the position of this pressure sensor 16, there is further a flap valve 17, as shown at an enlarged scale in FIG. 2. This flap valve 17 receives the rotation of a pulse motor 18 through a reduction gear 19 for its rotation, and has its extreme end located in the exhaust port 11' for switching of its exhaust timing. Reference numeral 20 stands for an encoder for detecting the working state of the pulse motor 18. Reference numeral 21 indicates an ignition coil for supplying high voltage to the ignition plug 10, and 22 denotes an ignition control.

In such various parts, the pre-pickup coil 13 is connected on its output side to a wave-shaping circuit 23, the post-pickup coil 14 is similarly connected to a wave-shaping circuit 24, and the pickup coil 15 for setting ignition timing is similarly connected to a wave-shaping circuit 25. Further, the output of the pressure sensor 16 is fed to a wave-shaping circuit 26. Supplied to an address detection circuit 27 is fed an output signal from the encoder 20 which forms part of the system for driving the flap valve 17 and is connected to the pulse motor. The output of the pressure sensor 16 passes through the wave-shaping circuit 26 to a peak detection circuit 28. One portion of the output of the peak detection circuit is sent to the output of the wave-shape circuit 23 receiving the signal from the pre-pickup coil 13 and an AND circuit 29, and another portion is tied in with the output of the wave-shaping circuit 24 receiving the post-pickup circuit in an AND circuit 30. The AND circuits 29 and 30 are respectively connected with flip flops 29' and 30' for sending the respective signals to an input circuit 33. The output of the wave-shaping circuit 25, which receives the output of the pickup coil 15 of the ignition timing, is guided to a counter 31, which produces data of the revolutions of the engine as the counter for counting the revolutions of the engine. The output from the wave-shaping circuit 25 is fed to an ignition control circuit 32, which reads out the data from the output of the wave-shaping circuit 25 and generates a reset signal simultaneously with a timing signal. In this manner, the operating state of the engine is detected to send the respective data to an input circuit 33 of, e.g., a microcomputer forming the controller.

That is to say, outputs of the flip flops 29' and 30', the counter 31 and the ignition control circuit 32 are sent to the input circuit 33. Reference numeral 40 is a compensating data input circuit, which feeds to the input circuit 33 various compensating data which would produce an influence due to a response delay owing to a heat buildup load such as a temperature state in the exhaust pipe 11 and other influences. The output of the input circuit 33 is fed to CPU 34 that is a control unit, to which CPU 34 is fed the output from the address detection circuit 27 for detecting the location of the pulse motor 18 for driving the flap valve 17. In this CPU 34, a memory 35 already written therein is compared and operated with the input data to send the given control output to a pulse motor drive circuit 37 through an output port 36. This pulse motor drive circuit 37 leads to the pulse motor 18 to rotate it in the given direction.

The embodiment of the present invention is to such a construction as mentioned above. In what follows, the control state achieved thereby will be explained with reference to FIG. 3 in which the angle of rotation of the crank is shown on abscissa in FIG. 3, and EO, EC, BDC and TDC stand for the timing for opening the exhaust port 11, the timing for closing the exhaust port 11, the bottom dead center of the piston and the top dead center of the piston, respectively. In this diagram, of the pickup coils 13, 14 and 15 indicated in the uppermost region, the pickup coil 15 is provided for the ignition timing and, hence, produces its output just before the top dead center TDC. On the other hand, the pre-pickup coil 13 for detecting eariler timing produces its output just prior to closing of the exhaust port 11', and the post-pickup coil 14 for detecting later timing detects timing just posterior to closing of the exhaust port 11. This waveform is the so-called sinusoidal form, which is shaped in the wave-shaping circuit, and produces its output on the basis of its phase timing. As a matter of course, on the other hand, the output waveform of the pressure sensor 16 describes a periodical waveform such that it is raised at the time of opening of the exhaust port 11' at which the combustion gases are discharged at once from within the cylinder 3, and the positive pressure of the reflected wave is later restored at the time of closing of the exhaust port 11'. At 5:50 8:15 this time, the reflected wave of the positive pressure is shaped by the wave-shaping circuit 26, and is thereafter produced as a pulse-like signal from the peak detection circuit 28. The output signals of such pre- and post-pickup coils 13 and 14 and the signal obtained by shaping the signal of the pressure sensor 16 by the peak detection circuit 28 are compared with each other in the AND circuits 29 and 30. Referring to the logical processing indicated in the upper Case 1 on this diagram, the peak of the reflected wave of the pressure sensor 16 appears in the latter half of timing slightly earlier than the time of closing of the exhaust port 11' detected by the pre-pickup coil 13, namely on the closing side of the exhaust port 11', whereby the output signal is produced from the AND circuit 29, and is fed to the input circuit 33. Since the phase produced by the post-pickup coil 14 is in coincidence with the peak of the reflected wave, on the other hand, and AND circuit 30 produces the given output. When such an output is produced, the degree of opening of the flap valve 17, viz., the timing for opening or closing the exhaust port 17 established thereby is taken as being matched in the operation of CPU 34, so that any command is not fed to the pulse motor 18 to keep its position.

Figure 8:
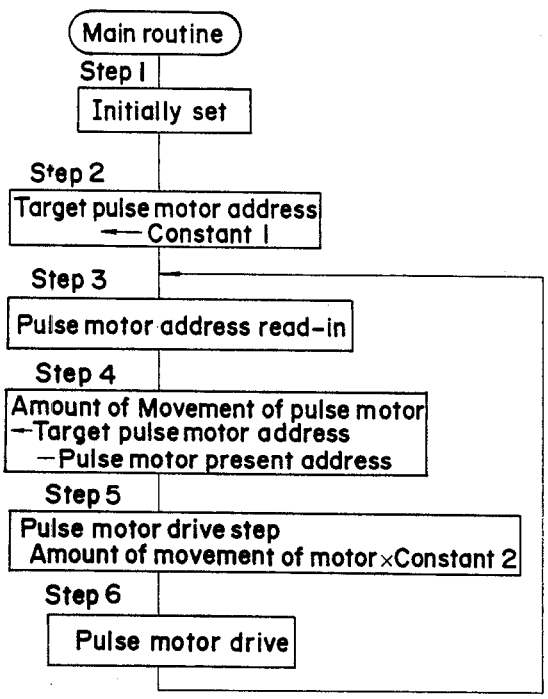
FIG. 8 is a control flow chart in CPU.

Brief reference will here be made to the control flow in CPU 34. As shown in FIG. 8, this is initially set in Step 1 to enable various inputs to be fed to CPU 34, and the target pulse motor address is set in Step 2. In this case, a signal input to coincide with Constant 1, viz., the initial value of the pulse motor 18 is fed. Subsequently, the addresses of the pulse motor 18 are sequentially read-in in Step 3 after starting of the engine, and the amount of movement of the pulse motor 18 is determined in Step 4 correspondingly. Upon the target pulse motor address being separately operated in Step 4, the amount of movement of the motor 18 is determined, corresponding to a difference between that address and the present pulse motor address. Thereafter, the driving steps of the pulse motor are operated in step 5 to produce a control signal that is a value obtained by multiplying the amount of movement of the motor by Constant 2 that is the number of steps of the pulse motor for each movement. The output is then provided in step 6 to the pulse motor 18 substantially as a drive signal for the pulse motor 18. The output signal from this Step 6 is further re-fed to Step 3 as a loop signal to generate the optimum drive signal for the pulse motor 18, which corresponds to sequential changes in the rotation of the engine.

On the other hand, when, as a result of the peak of the reflected wave of the positive pressure being detected as shown in Case 2 given in the middle region of the diagram, that peak appears only in the range of the pre-phase signal, and is not found in the range of the post-phase signal, only the AND circuit 29 produces its output, but the AND circuit 30 does not. In view of the operating state of the engine, this means that the timing for closing the exhaust port 11' should be put forward. Thus, the output from CPU 34 causes the pulse motor 18 to generate a control signal in the pulse motor drive circuit 37, by which the extreme end of the flap valve 17 is moved in the n address direction, viz., downwardly. In the output case shown in Case 3 given in the lowermost region of the diagram, the peak of the reflected wave is in the post-phase range, and only the AND circuit 30 produces its output, but the AND circuit 29 does not. In this case, the pulse motor 18 produces its control signal which rotates the flap valve 17 in the zero address direction to delay the timing for closing the exhaust port 11'. As a matter of course, the absence of any output from the pressure sensor 16 indicates that the engine is at a standstill and, hence, various devices for controlling the flap valve 17 are not in operation.

As stated above, various controls corresponding to the rotation of the engine are carried out. Referring generally to this with reference to the flow chart given in FIG. 9, the operation of the target position is carried out in Step 1 of FIG. 9 on the basis of various data fed to CPU 34, and the output values of the flip flops 29' and 30' are fed in Step 2. Thereafter, the present address of the pulse motor 18 is fed in Step 3. After such input, various controls are carried out in association with the revolutions of the engine and the position of the flap valve 17. That is, Step 4 indicates the state of the signal fed. Referring first to the state shown in the rightmost region of the flow chart of FIG. 9, viz., where there are the outputs from the flip flops 29' and 30', the degree of opening of the flap value 17 coincides with the position of the pulsating wave of exhaustion corresponding to the revolutions of the engine. For that reason, the target pulse motor address is already obtained, so that a signal is sent to the pulse motor 18 in Step 5 to keep the present address. This holds for the so-called Case 1, as previously mentioned. Turning to the state indicated just on the left side, the flip flops 29' and 30' each produces no output. What is presumed in this case is stopping or extremely low rotation of the engine, or other failure, etc. of the control circuit leading to the flip flops 29' and 30'. In this case, the target pulse motor address sends a 8:30 8:40 signal in Step 5 to somehow move the flap valve 17 in the zero address direction. It goes without saying that since this is the so-called state of emergency where any inputs to the flip flops 29' and 30' are not obtained, that is to say, failure of the circuit leading its way thereto takes place, some means may be taken to stop the flap valve 17 at a position where the engine rotates properly, while producing the most efficient output, according to its purpose. Extreme cases are that in the case of an engine for which high-speed rotation is always required, the flap valve 17 may be located in the zero address direction; in the case of an engine in which weight is given to the output or torque in the middle-speed range, it may be located substantially intermediate between the zero and n address positions; and in the case of an engine in which weight is placed on the output at an extremely low-speed rotation, it may be located in n address position for halt. Of course, it is preferred that the flap valve 17 be located in the zero address direction, while the engine is at a standstill. This is because, in the case of a two-cycle engine for instance, the actual compression ratio drops and an extremely light force may be applied on a kick pedal for its starting and in the case of a cell motor, its load can be reduced. In the further lefthand case where only the flip flop 30' produces its output in the absence of any output from the flip flop 29', that is, in the already mentioned Case 2, the target pulse motor address is controlled by a value obtained by adding to the present address Constant 3 that is determined by the state of a vehicle in use or the time constant of an actuator. In this case, the target pulse motor address is compared with its maximum address value to make determination as to whether it is small or not. If smaller, a signal is produced in Step 7 to move the target pulse address in the n address direction. If not smaller than the n address, that is, if an equal signal is sent out, then the target control position is found. Referring further to the leftmost state, this is the case where the flip flop 29' produces its output in step 4, but the flip flop 30' does not, viz., Case 3 as mentioned eariler. Thus, since this holds for the case the revolutions of the engine is lower as compared with the present exhaust timing, the target pulse motor address is set at a value obtained by substracting Constant 3 from the present address of the pulse motor. Thereafter, whether the target pulse motor address is zero or not is again compared in Step 6. If larger than zero, then control is applied to move the target motor address in the zero direction in Step 7. If the target pulse motor address equals zero, no control is then required. Therefore, it is again returned to the target position operation for repeated control to obtain control values corresponding to the next situation changes.

At the stage at which there has been provided a power source for driving the pulse motor 18 for controlling the flap valve 17, suitable instructions for, e.g., the so-called self-cleaning involving one reciprocation of the flap valve 17 may be given. Alternatively, the self-cleaning may also be carried out, when the output of the counter 31 is substantially zero. In this case, cleaning may be carried out automatically when an engine stop switch is in use. By such controlling, it is constantly possible to allow the positive reflected wave to coincide timely with the moment the exhaust port 11' closes, whereby the efficiency of the intake/exhaust system and the charging efficiency can constantly be kept stable.

(ii) Embodiment Applied to the Intake System of a Four-Cycle Engine

This embodiment is designed to make efficient use of internal pulsation occurring within the intake system of a four-cycle engine which extends from an air cleaner to an intake port through a carburetor, whereby the positve pressure wave of the reflected wave of pulsation is timely admitted into an intake valve just prior to its closing for the purpose of achieving improved charging efficiency.

Figure 4:
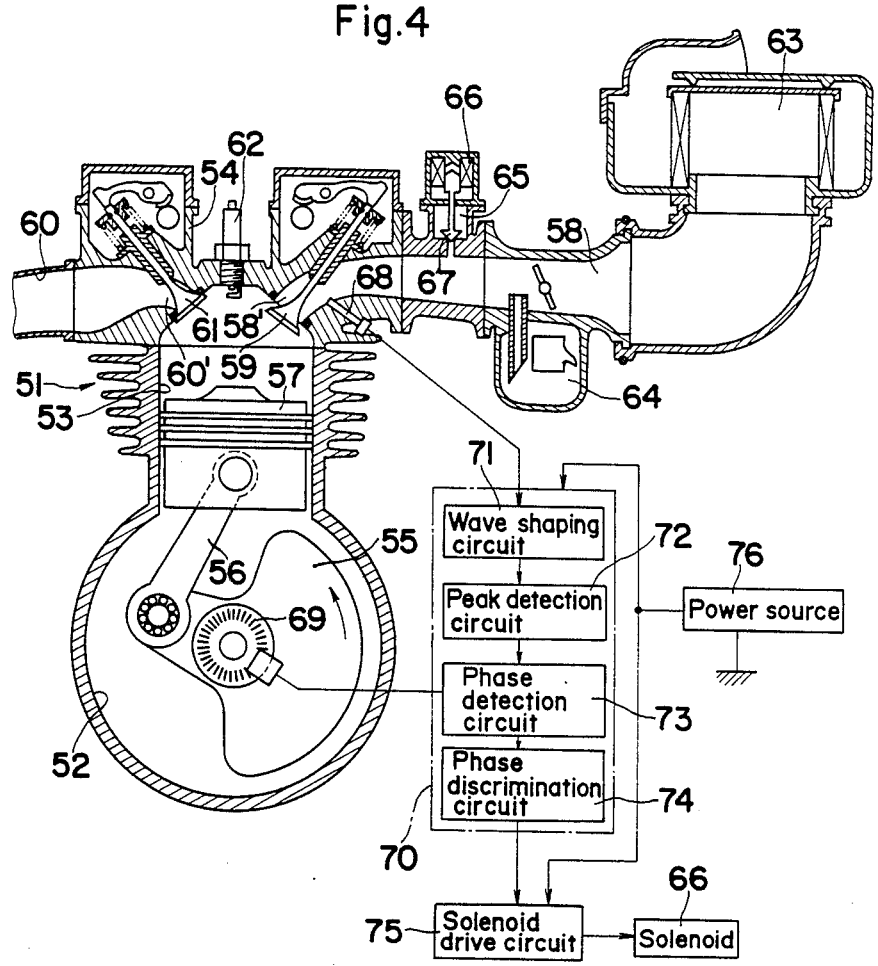
FIG. 4 is a view illustrating one embodiment of the intake system of a four-cycle gasoline engine, to which the present invention is applied.

This embodiment will not be explained with reference to FIGS. 4 and 5. First, reference numeral 51 stands for a four-cycle type of engine, which includes a cylinder 53 attached to a crank case 52 and a cylinder head 54 mounted above the cylinder 53. Rotating within the crank case 52 is a crank 55 connected with a connecting rod 56, which has its extreme end connected with a piston 57 reciprocating within the cylinder 53. Connected to the cylinder head 54 is an intake pipe 58 having an intake port 58' provided with an intake valve 59. In association with this, an exhaust pipe 60 is connected to the cylinder head 54, having an exhaust port 60' provided with an exhaust valve 61. Further, the pre-cylinder head 54 is provided with an ignition plug 62.

In the intake system to which the present invention is applied, the intake pipe 58 is provided with an air cleaner 63 at its open end, a carburetor 64 somewhere thereon, and a subchamber 65 downstream of the direction of an air flow. That subchamber 65 is a device specifically for impedance changing in the instant intake system, and is incorporated with a solenoid 66 in its upper portion, and a valve rod 67 operated thereby is adapted to open or close between the subchamber 65 and the intake pipe 58. Further, a pressure sensor 68 is provided in the vicinity of the intake port 58' in the intake pipe 58, while a crank angle sensor 69 is mounted directly on a crank shaft. Signals detected in the pressure and crank angle sensors 68 and 69 are fed to a control circuit 70. This control circuit 70 comprises a wave-shaping circuit 71, a peak detection circuit 72, a phase detection circuit 73 and a phase discrimination circuit 74. An input signal from the pressure sensor 68 is first fed to the wave-shaping circuit in the control circuit 70. On the other hand, an output signal from the crank angle sensor 69 is fed to the phase detection circuit 73. The output of the control circuit 70 is fed from the phase discrimination circuit 74 to a solenoid drive circuit 75. It is to be noted that reference numeral 76 denotes a power source supplied to the solenoid drive circuit 75 and the control circuit 70. Then, the solenoid drive circuit 75 is connected to a solenoid 66 in the subchamber 65.

This embodiment is of the construction as mentioned above, and operates as follows.

Figure 5:
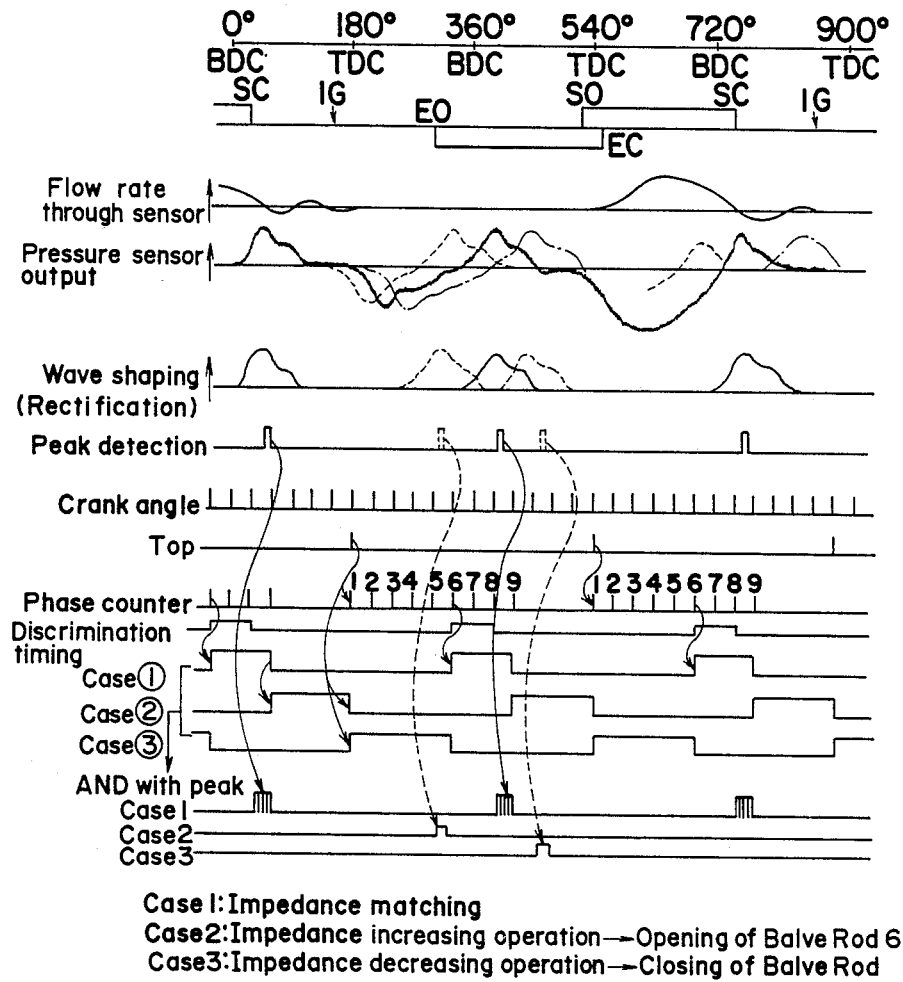
FIG. 5 is a control diagram of the aforesaid controller.

Referring to the diagram shown in FIG. 5, because of the four-cycle engine the illustrated embodiment achieves the respective strokes of suction, compression, combustion and exhaustion at a crank angle of 720°, viz., in two rotations of the crank. In this diagram, SC denotes closing of the intake port, SO, opening of the intake port, EC, closing of the exhaust port, and IG indicates an ignition timing. On the uppermost portion of this diagram, there is also shown the flow rate through the sensor. The pressure waveform detected by the pressure sensor 68 is substantially as shown at the second stage and, upon the intake port 58' being closed, the reflected wave in the intake pipe occurs as the positive pressure wave. Then, the reflected wave occurs as the negative pressure wave after a while from the point of time at which the piston passes the top dead center, viz., from the point of time at which the crank angle reaches around 180°, appears again as the positive pressure wave from just before the bottom dead center, and reaches one peak. Thereafter, the reflected wave occurs as the negative pressure wave from the crank angle of some 540°, and appears again as the positive pressure wave in the vicinity of the bottom dead center. Such a waveform is shaped in the wave-shaping circuit in the control circuit as depicted just below, and shows the respective peaks at the bottom dead center. On the basis of such a shaped waveform, the respective pulse-like peaks are detected at positions somewhat delayed from the bottom dead center in the peak detection circuit 72. On the other hand, the detection of the crank angle is carried out by the phase detection circuit in response to the signal from the crank angle sensor 69 and is so-called of a counter type in which the revolutions of the plate joined directly to the crank shaft are counted to discriminate the given timings such as the top and bottom dead centers. In the phase discrimination circuit 74, the discrimination timing includes a range I covering the top dead center, a range II covering from the bottom dead center to the vicinity of the top dead center and a range III covering therefrom to the top dead center includes a discrimination timing producing no output in both ranges. In Case 1 where the positive pressure wave peak of the reflected wave in the intake pipe is found to be in the timing range I by the discrimination of the AND circuit and to depart from the Timing Ranges II and III by the processing of the AND circuit, the positive pressure wave of the reflected wave in the intake system is located just prior to closing of the intake valve 59, so that the most ideal impedance matching is achieved for the intake system. In this case, therefore, no particular command is ordered from the control circuit 70 to the solenoid drive circuit 75, thereby maintaining that state. Of course, that state remains intact even when, for instance, the valve rod 67 in the subchamber 65 is either opened or closed for tuning.

Referring next to Case 2, it is assumed that the peak waveform is returned to the leading side at a relatively early timing. In this case, the peak departs from Timing Ranges I and II, and coincides with Timing Range III, so that the reflected wave propagates earlier by the operation of the AND circuit. For that reason, the valve rod 67 is opened by increasing the impedance, viz., attracting the solenoid 66 to communicate the subchamber 65 with the intake pipe 58.

In Case 3 in which the peak detection is delayed as compared with Case 1, it coincides with Timing Range II, but departs from Timing Ranges I and III. Therefore, the positive pressure of the reflected wave is delayed by the processing of the AND circuit therebetween. In this case, the volume of the subchamber 65 is not superposed upon the volume of the intake pipe by the device for decreasing the impedance in the intake pipe, viz., closing the valve rod 67 in the subchamber 65.

(iii) Embodiment of Mechanical Type Control Mechanism

Figure 6:
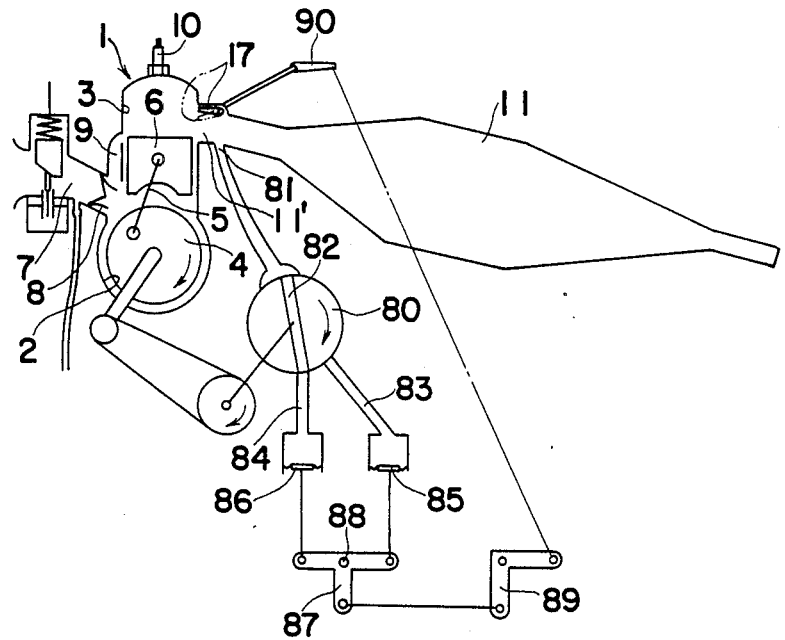
FIG. 6 is a side view showing one embodiment of the instant controller which is applied in the form of a mechanical control mechanism.
Figure 7:
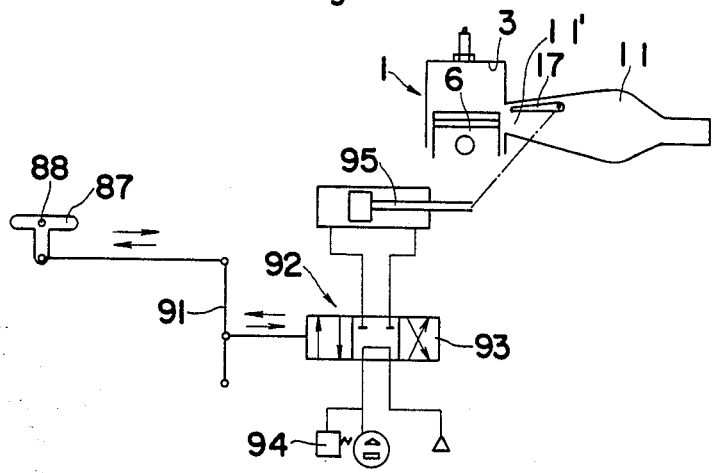
FIG. 7 is a schematical view illustrating the hydraulically operated mechanical type mechanism in the aforesaid controller.

This embodiment is illustrated in FIGS. 6 and 7, and is applicable to a piston valve type of two-cycle engine by way of example. Since the engine, to which the instant embodiment is applied, is substantially the same in mechanism as that of the first embodiment already mentioned, the respective parts are shown by common reference numerals. Referring to the mechanism unique to this embodiment, the revolutions of a crank 4 is reduced to ½ from the output side to drive a control rotary valve 80. This rotary valve 80 rotates within a closed casing, which communicates with a pressure sensor opening 81 open in the vicinity of an exhaust port 11' in an exhaust pipe 11, said pressure sensor opening 81 being designed to have a slightly larger area of connection at a point tying in with the control rotary valve 80. The control rotary valve 80 includes therein one communication hole 82. On the side of the control rotary valve 80 opposite to its side communicating with the pressure sensor opening 81, there are formed discrimination holes 83 and 84 on the leading and delay sides of timing, by way of example, to which discrimination holes 83 and 84 are connected diaphragms 85 and 86. By way of example, the rod for operating these diaphragms are connected with a T-shaped link 87, which turns around its fulcrum 88 as the rod for operating the diaphragms moves. The lowermost projection of the T-shaped link 87 is connected to a shift lever 90 of a flap valve 17 through a bell crank 89.

In such a mechanical type of mechanism, upon the positive pressure of the reflected wave reaching the pressure sensor opening 81, as illustrated, the positive pressure wave passes through the pressure sensor opening 81 to the communication hole 82 in the control rotary valve 80, and actuates the diaphragm 86 of the delay timing connected to the discrimination hole 84 of the delay timing, since the communication hole 82 in the control rotary valve 80 is in coincidence with that hole 84. Then, the T-shaped link 87 turns around its the fulcrum 88 in the counterclockwise direction in the drawing, whereby the bell crank 89 and the shift lever 90 are similarly turned in the counterclockwise direction in the drawing. As a result, the extreme end of the flap valve 17 operated by the shift lever 90 is moved downwardly, whereby the timing for closing the exhaust port 11' is set earlier to adjust the impedance in the exhaust system. On the contrary, when returning of the positive pressure wave of the reflected wave occurs early, the diaphragm 85 for discriminating early timing is actuated for the operation counter to the foregoing, whereby the extreme end of the flap valve 17 is moved upwardly to delay the timing for closing of the exhaust port 11'.

The embodiment as described above in FIG. 6 makes use of diaphragms for the mechanical operation; however, cases are expected in which any torque sufficient to turn the flap valve 17 is not obtained by direct operation of the diaphragms. In such cases, the flap valve 17 may hydraulically be turned. That is, as illustrated in FIG. 7, the T-shaped link 87, to which the outputs of the diaphragms 85 and 86 are transmitted, is transmitted to a relay link 91, by which the switching of a plunger 93 in a hydaulic valve 92 is achieved. Then, the switching of a pump is achieved by a hyraulic pressure from a hydraulic pump 94 to move the piston 95 in the given direction, which in turn actuates the flap valve 17.

POSSIBILITY IN INDUSTRIAL USE

The pulsation controller in the intake/exhaust systems of internal combustion engines according to the present invention is most effectively applicable to internal combustion engines for vehicles such as motorcycles and automobiles and others.

We claim:

1. A pulsation controller in the exhaust system in an internal combustion engine having a cylinder connected to an intake pipe and an exhaust pipe and a piston movably mounted within said cylinder comprising:
    pressure detection means for detecting a pressure peak in said exhaust pipe and;
    control means for detecting said peak pressure only when said piston is located at a given position and allowing a desired pressure wave in said exhaust pipe to coincide with a given piston position.

2. The pulsation controller of claim 1 further comprising means for varying the timing of the opening period of and exhaust port of the cylinder.

3. A pulsation controller in the intake system of an internal combustion engine having a cylinder connected to an intake pipe and an exhaust pipe and a piston movably mounted within said cylinder and carrying out respectively the strokes of suction, compression, combustion and exhaust, comprising:
    a pressure detector for detecting a pressure peak in said intake pipe disposed adjacent to an intake port of said cylinder;
    a controller for detecting said pressure peak only when said piston is at a given position and allowing a desired pressure wave in said intake pipe to coincide with a given piston position;
    variable impedance means for said intake system; and
    a variable impedance controller for controlling said variable impedance means so as to produce a pressure peak in a given angular range of the exhaust stroke from the combustion stroke.

4. A pulsation controller in the exhaust system in an internal combustion engine having a cylinder connected to an intake pipe and an exhaust pipe and a piston movably mounted within said cylinder comprising;
    a pressure detector for detecting a pressure peak in said exhaust pipe disposed adjacent to an exhaust port in said cylinder;
    a controller for detecting said pressure peak only when said piston is located at a given position and allowing a desired pressure wave in said exhaust pipe to coincide with a given piston position;
    means for varying the timing of an exhaust port including an exhaust port timing valve with said controller controlling said means for varying the timing so as to produce a pressure peak just before said exhaust port is closed by said piston.

5. The pulsation controller of claim 4 wherein said exhaust port timing valve is disposed at an upper edge position of said exhaust port in a two-cycle internal combustion engine.

6. A pulsation controller in the intake system of an internal combustion engine having a cylinder connected to an intake pipe and an exhaust pipe and a piston movably mounted within said cylinder comprising;
    a controller for detecting a pressure peak only when said piston is at a given position and allowing a desired pressure wave in said intake pipe to coincide with given piston position in the intake system; and a pressure detector for detecting a pressure peak in said intake pipe; said pressure detector including a control rotary valve which is rotatable in synchronism with a crank shaft and is open corresponding to a given piston position, thereby having the pressure in said intake pipe communicable with said controller.

7. A pulsation controller in the exhaust system of an internal combustion engine having a cylinder connected to an exhaust pipe and an exhaust pipe and a piston movably mounted within said cylinder comprising;
   a controller for detecting a pressure peak only when said piston is at a given position and allowing a desired pressure wave in said exhaust pipe to coincide with given piston position in the exhaust system; and
   a pressure detector for detecting a pressure peak in said exhaust pipe; said pressure detector including a control rotary valve which is rotatable in synchronism with a crank shaft and is open corresponding to a given piston position, thereby having the pressure in said exhaust pipe communicable with said controller.

8. A pulsation controller in the intake system in an internal combustion engine having a cylinder connected to an intake pipe and an exhaust pipe and a piston movably mounted within said cylinder comprising:
   pressure detection means for detecting a pressure peak in said intake pipe and;
   control means for detecting said peak only when said piston is located at a given position and allowing a desired pressure wave in said intake pipe to coincide with a given piston position.

9. A pulsation controller in the exhaust system in an internal combustion engine having a cylinder connected to an intake pipe and an exhaust pipe and a piston movably mounted within said cylinder comprising:
   pressure detection means for detecting a pressure peak in said exhaust pipe; and
   control means for detecting said peak pressure only when said piston is located at a given position and allowing the pressure peak in said exhaust pipe adjacent to an exhaust port of said cylinder to occur just before the end of the exhaust stroke.

10. A pulsation controller in the intake system of an internal combustion engine having a cylinder connected to an intake pipe and an exhaust pipe and a piston movably mounted within said cylinder and carrying out respectively the strokes of suction, compression, combustion and exhaust, comprising:
    a pressure detector for detecting a pressure peak in said intake pipe disposed adjacent to an intake port of said cylinder;
    variable impedance means for said intake system;
    a controller for detecting said pressure peak only when said piston is at a given position and controlling said variable impedance means to produce said pressure peak in the intake pipe portion adjacent to the intake port in a given angular range of the exhaust stroke; and
    a variable impedance controller for controlling said variable impedance means so as to produce a pressure peak in a given angular range of the exhaust stroke from the combustion stroke.

11. A pulsation controller in the exhaust system in an internal combustion engine having a cylinder connected to an intake pipe and an exhaust pipe and a piston movably mounted within said cylinder comprising;
    a pressure detector for detecting a pressure peak in said exhaust pipe disposed adjacent to an exhaust port in said cylinder;
    means for varying the timing of an exhaust port including an exhaust port timing valve; and
    a controller for detecting said pressure peak only when said piston is located at a given position and controlling said means for varying the timing to produce said pressure peak in said exhaust pipe portion adjacent to the exhaust port just before said exhaust port is closed by said piston.

12. A pulsation controller in the intake system of an internal combustion engine having a cylinder connected to an intake pipe and an exhaust pipe and a piston movably mounted within said cylinder comprising:
    a pressure detector for detecting a pressure peak in said intake pipe, said pressure detector including a control rotary valve which is rotatable in synchronism with a crank shaft and is open corresponding to a given piston position;
    variable impedance means for said intake system; and
    a controller for detecting a pressure peak only when said control rotary valve is open and controlling said variable impedance means to produce a desired pressure wave in said intake pipe disposed adjacent to an intake port of said cylinder to coincide with a given position in the intake system.

13. A pulsation controller in the exhaust system of an internal combustion engine having a cylinder connected to an intake pipe and an exhaust pipe and a piston movably mounted within said cylinder comprising;
    a pressure detector for detecting a pressure peak in said exhaust pipe, said pressure detector including a control rotary valve which is rotatable in synchronism with a crank shaft and is open corresponding to a given piston position;
    means for varying the timing to close an exhaust port; and
    a controller for detecting a pressure only when said control rotary valve is open and controlling said means for varying timing to produce a desired pressure wave in said exhaust pipe adjacent to an exhaust port of said cylinder just before said exhaust port is closed by said piston.

* * * * *